United States Patent
Bazer-Bachi et al.

(10) Patent No.: US 8,383,846 B2
(45) Date of Patent: Feb. 26, 2013

(54) METHOD OF PREPARING ALCOHOL ESTERS FROM TRIGLYCERIDES AND ALCOHOLS USING HETEROGENEOUS CATALYSTS COMBINING AT LEAST A $ZN_xAL_2O_{3+x}$ TYPE SOLID SOLUTION AND ZNO

(75) Inventors: Delphine Bazer-Bachi, Saint-Genis-Laval (FR); Vincent Coupard, Valencin (FR); Sylvie Maury, Charly (FR); Bernadette Rebours, Lyon (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 445 days.

(21) Appl. No.: 12/645,790

(22) Filed: Dec. 23, 2009

(65) Prior Publication Data

US 2010/0154295 A1  Jun. 24, 2010

(30) Foreign Application Priority Data

Dec. 23, 2008 (FR) ..................................... 08 07413

(51) Int. Cl.
*C11B 3/00* (2006.01)
(52) U.S. Cl. ..................................................... 554/168
(58) Field of Classification Search .................. 554/168
See application file for complete search history.

(56) References Cited

U.S. PATENT DOCUMENTS

| 5,908,946 | A | 6/1999 | Stern et al. |
| 2004/0034244 | A1 | 2/2004 | Bournay et al. |
| 2004/0234448 | A1 | 11/2004 | Hillion et al. |
| 2007/0066838 | A1 | 3/2007 | Hillion et al. |

FOREIGN PATENT DOCUMENTS

| EP | 1 352 893 A1 | 10/2003 |
| EP | 1 468 734 A1 | 10/2004 |
| FR | 2 752 242 A1 | 2/1998 |

OTHER PUBLICATIONS

Search Report of FR 0807413 (Sep. 3, 2009).
J. Jitputti et al., "Transesterification of Crude Palm Kernel Oil and Crude Coconut Oil by Different Solid Catalysts," Chemical Engineering Journal, vol. 116 (2006) pp. 61-66.
Z. Yang et al., "Soybean Oil Transesterification Over Zinc Oxide Modified with Alkali Earth Metals," Fuel Processing Technology, vol. 88 (2007) pp. 631-638.

*Primary Examiner* — Deborah D Carr
(74) *Attorney, Agent, or Firm* — Millen, White, Zelano & Branigan, P.C.

(57) ABSTRACT

A method of preparing a composition of alcohol esters of linear monocarboxylic acids with 6 to 26 carbon atoms from a vegetable or animal oil, neutral or acid, virgin or recycled, with monoalcohols having 1 to 18 carbon atoms, in the presence of a catalyst combining at least a solid solution of $Zn_xAl_2O_{(3+x)}$ type, wherein x ranges between 0 and 1 (end points excluded), and free ZnO present between 7 and 30 mass %, allows to directly obtain, in one or more stages, an ester that can be used as fuel and a pure glycerin.

20 Claims, No Drawings

METHOD OF PREPARING ALCOHOL ESTERS FROM TRIGLYCERIDES AND ALCOHOLS USING HETEROGENEOUS CATALYSTS COMBINING AT LEAST A $ZN_xAL_2O_{3+x}$ TYPE SOLID SOLUTION AND ZNO

FIELD OF THE INVENTION

The present invention relates to a new method of preparing alcohol esters of monocarboxylic acids from fatty substances of vegetable or animal origin by heterogeneous catalysis.

The mainly desired reaction is a transesterification carried out according to path I below and possibly a coupled esterification and transesterification reaction, esterification being achieved according to path II below.

Path I:

1 triglyceride+3 alcohols→3 fatty substance esters+ glycerin

Path II:

Fatty acid+alcohol→fatty acid esters+water

Fatty acid+glycerin→glyceride+water

BACKGROUND OF THE INVENTION

Fatty substance esters are currently used in many applications as diesel fuels, furnace fuel oils, ecological solvents, base compounds for manufacturing fatty alcohol sulfonates, amides, ester dimers, etc.

In the case of diesel fuel, which is today a major application for fatty substance esters, a certain number of specifications have been established, whose list, limits and methods belong to standard EN 14,214 (2003) currently applicable in Europe. The ester must contain at least 96.5 mass % esters, at most 0.8 mass % monoglycerides, at most 0.2 mass % diglycerides and at most 0.2 mass % triglycerides, few free fatty acids (<0.5 mg KOH per g) that may be corrosive, less than 0.25 mass % bonded and free glycerin, and metals only as traces. This involves a precise protocol to obtain the desired purity.

When preparing an ester from oil or fat and monoalcohol, depending on the nature of the oil initially used, 10 to 15 mass % of a secondary product, which is glycerin, automatically forms. This glycerin can be valorized in many applications but it first has to be purified (removal of metals, salts, water). Vacuum bidistillation is often necessary in order to reach this purity.

In short, most commercial ester manufacturing methods lead quite readily to raw products (esters and glycerin) that however have to be deeply purified using various treatments that eventually burden the cost of the conversion.

It is well known to produce methyl esters using conventional means such as homogeneous catalysis with soluble catalysts, such as soda or sodium methylate, by reacting a neutral oil and an alcohol such as methanol (for example JAOCS 61, 343-348 (1984)). A pure product that can be used as fuel and a glycerin meeting the specifications are however obtained only after many stages. In fact, the glycerin obtained is polluted by alkaline salts or alcoholates, so that the glycerin purification plant is almost as costly as the ester manufacturing plant.

Heterogeneous catalysis methods afford the advantage of producing catalyst-free esters and glycerin, which are therefore easily purified. However, it is often difficult to economically obtain both an ester and a glycerin of high purity.

Many metal oxides have been used to catalyze the transesterification reaction. This was recently the case with lithium-doped (Xie et al., *Ind. Eng. Chem. Res.*, 2007, 10.1021/ ie070597s) or barium-doped zinc oxide (Xie et al., *Catalysis Letters* (2007) 117, 159-165). Reddy et al. (*Energy Fuels*, 2006, 20, 1310) suggest using nanocrystalline calcium oxide that thanks to the formation, in the presence of methanol, of $Ca(OMe)_2$ species exhibits the behaviour of an essentially heterogeneous catalyst. Many authors have also studied the behaviour of magnesium oxide (Dossin et al., *Applied Catalysis B*, 2006, 61, 35-45). These alkaline-earth metal oxides have non-zero solubilities in methanol (Gryglewicz, *Bioresour. Technol.*, 1999, 70, 249), which poses catalyst leaching and stability problems leading to a significant activity decrease upon recycling. The solution provided for zinc oxide based catalysts consisting in regenerating the catalyst by lithium or barium nitrate impregnation cannot be transposed to an industrial use. Furthermore, with this type of catalysts, the leached metal species are found in the products obtained (ester and glycerin), leading to a degradation of their quality and their non-conformance to the specifications imposed on biodiesel fuels. European patent EP-B-0,198,243 describes the manufacture of methyl esters by transesterification of an oil with methanol, using as the catalyst an alumina or a mixture of alumina and of ferrous oxide. However, the liquid hourly space velocity (volume of oil injected/volume of catalyst/hour) is low, the amount of glycerin collected is much less than that theoretically expected and the purity of the esters obtained is rather low (ranging between 93.5% and 98%).

Methods using a catalytic system based on metallic oxides, alone or in combination, deposited or not on an alumina, have been described. Patent FR-B-2,752,242 filed by the applicant describes the use of solid and non soluble catalysts formed from alumina and zinc oxide or zinc aluminate, wherein the free zinc oxide content is limited to 2 mass %.

Patent application EP-1,468,734 filed in the name of the applicant provides a method of preparing a catalyst comprising zinc aluminate, zinc oxide and alumina, and having mechanical crush resistance properties improved through substitution of zinc carbonate or nitrate for part of the zinc oxide in the preparation process. The free zinc oxide content is limited to 2 mass %. No catalytic test result is shown in this document.

Surprisingly enough, inventors have discovered that using a catalyst prepared according to a particular method of operation and containing more than 7 mass % free ZnO is not detrimental to the catalyst stability or leaching of the zinc in the reaction medium. On the contrary, it appears that it is advantageous to use these catalysts containing notably more than 2 mass % free ZnO, which is against the teaching of patent application EP-1,468,734, and having mechanical properties suited to use in industrial reactors.

DETAILED DESCRIPTION

The present invention describes a method of improving patent FR-B-2,752,242 for preparing a composition of alcohol esters of linear monocarboxylic acids with 6 to 26 carbon atoms and glycerin, wherein a fatty substance of animal or vegetable origin is reacted with an aliphatic monoalcohol having 1 to 18 carbon atoms, in the presence of at least one ZnO-containing heterogeneous catalyst and at least one solid solution of general formula $Zn_xAl_2O_{(3+x)}$, the free ZnO being present between 7 and 30 mass % and x in the [0; 1] range, i.e. a range between 0 and 1, end points excluded.

The free zinc oxide content preferably ranges between 10 and 30 mass %.

The method of preparing the catalyst used in the present invention comprises at least the following stages:
1) premixing the powders (zinc oxide and alumina precursor or zinc oxide, $Zn_xAl_2O_{(3+x)}$ and alumina precursor) by rotating the arms of a mixer,
2) mixing the powders in the presence of at least one peptization agent (mineral or organic acid),
3) extruding the paste obtained after mixing, at a pressure ranging between 3 and 10 MPa,
4) thermal treatment comprising at least:
    d1) a stage of drying the extrudates obtained in stage c)
    d2) calcination in air
5) optionally crushing for a different shaping of the extrudate obtained at the end of the previous stages.

Another method of preparing the catalyst used in the present invention comprises the following stages:
a) peptizing the alumina precursor in the presence of at least one peptization agent of mineral or organic acid type,
b) adding at least one zinc oxide, or at least one zinc oxide and a mixed $Zn_xAl_2O_{(3+x)}$ oxide to the paste obtained in stage a) and mixing the mixture obtained,
c) extruding the paste obtained after mixing, at a pressure ranging between 3 and 10 MPa,
d) thermal treatment comprising at least:
    d1) a stage of drying the extrudates obtained in stage c)
    d2) calcination in air
e) optionally crushing for a different shaping of the extrudate obtained at the end of the previous stages.

The catalyst used in the present invention can come in form of powder, extrudates, balls or pellets.

Sources of ZnO, Alumina and Aluminate

Many zinc oxide preparation methods are described in the literature: indirect process, also referred to as French process, direct process, also referred to as American process, or dehydration of zinc hydroxide obtained by precipitation, decomposition of the various zinc precursors, whether commercial or obtained by preliminary precipitation.

Commercial zinc oxides can be used for preparing the solid according to the invention. The zinc compounds used are selected from among commercial zinc oxides or those prepared by means of any other synthesis route.

The alumina precursor used meets the general formula $Al_2O_3$, $nH_2O$. It is in particular possible to use alumina hydrates such as hydrargilite, gibbsite, bayerite, boehmite or pseudo-boehmite and amorphous or essentially amorphous alumina gels. A mixture of these products in any combination can also be used. It is also possible to use the dehydrated forms of these compounds consisting of transition alumina and comprising at least one of the phases from the group: rho, khi, eta, gamma, kappa, theta and delta, which essentially differ in the organisation of their crystal structure.

If $Zn_xAl_2O_{(3+x)}$ is incorporated directly during shaping, it can be prepared by means of conventional methods known to the person skilled in the art: co-precipitation of zinc and aluminium precursors, hydrothermal synthesis, sol-gel process, impregnation of zinc precursors on alumina.

The $Al_2O_3$/ZnO mass ratio preferably ranges between 70/30 and 40/60.

The peptization agent is preferably selected from among hydrochloric acid, sulfuric acid, nitric acid, acetic acid and formic acid.

Selection of the peptization agent (amount, concentration, nature) and the mixing conditions, such as stirring rate, mixing time and loss on ignition are important parameters.

The peptization agent concentration preferably ranges between 2 and 15 mass % with respect to the oxides, more preferably between 4 and 10 mass %.

Mixing is carried out in a mixer for a duration ranging between 5 and 75 min.

The rotating speed of the arms of the mixer is less than 150 rpm.

Preferably, mixing is carried out for a duration ranging between 15 and 60 min, at a mixer arm rotating speed ranging between 15 and 75 rpm.

Extrusion can be carried out for example in a piston extruder, a single-screw or a double-screw extruder, using any die type, for example cylindrical, three-lobed, four-lobed, grooved, or any other geometrical shape.

The extrudates obtained are subjected to a thermal treatment consisting of drying carried out at a temperature ranging between 40° C. and 150° C., then calcination at a temperature ranging between 300° C. and 1100° C.

Most preferably, drying is performed between 70° C. and 120° C., and calcination between 350° C. and 800° C.

The active catalytic phase according to the present invention $Zn_xAl_2O_{(3+x)}$+7 to 30% ZnO is obtained by selecting precise operating conditions and, more particularly, by selecting the right compromise between the favourable mixing and temperature parameters allowing the active phase to be obtained.

One advantage of the method according to the invention using a catalyst with a higher ZnO content than the one described in the prior art and at least one solid solution of $Zn_xAl_2O_{(3+x)}$ type lies in an improved catalytic activity, which allows to operate at a lower temperature, to decrease the contact time between the reactants and/or to limit the alcohol/fatty substance ratio in relation to the prior art, while maintaining a high ester selectivity.

Another advantage of the invention lies in the fact that these solids catalyze transesterification and esterification reactions according to a heterogeneous catalysis process. Thus, the catalyst is not consumed in the reaction and is not dissolved in the reaction medium. By remaining in the solid form, it is easily separated from the reaction medium without catalyst loss and without pollution of the reaction medium by dissolved species or catalyst residues.

The activity and the selectivity of this catalyst are not affected by the transesterification or esterification reaction: the catalyst is stable and recyclable under the experimental reaction conditions. This type of catalyst is compatible with use in a continuous industrial process, with a fixed bed for example, wherein the catalyst feed can be used for a very long time without any activity loss.

The mechanical properties of the catalyst used in the present invention are determined by the average crushing strength test described by the ASTM method D 4179-88a. It consists in measuring the breaking strength of each particle of a representative sample comprising at least 50 particles. The result is weighted by the length of the extrudate.

The average crushing strength value is the mean of the measured breaking strengths with respect to the extrudate length unit (expressed in $daN \cdot mm^{-1}$) for all the particles of the sample.

In the case of the catalyst used according to the invention, the average crushing strength value is above 0.8 $daN \cdot mm^{-1}$ (decaNewton per millimeter of extrudate length) and preferably above 1.0 $daN \cdot mm^{-1}$. The mechanical strength of the catalyst obtained is thus widely acceptable for use in a fixed-bed industrial process.

Fatty Substances

The fatty substances used in the method according to the invention correspond to natural or elaborate substances, of animal or vegetable origin, predominantly containing triglycerides, commonly referred to as oil and fats.

Examples of oils that can be used are all the common oils, such as palm oil (concrete or olein), soybean oil, palm nut oil, copra oil, babassu oil, rapeseed oil (old or new), sunflower oil (conventional or oleic), corn oil, cotton oil, peanut oil, pourgher oil (*Jatropha curcas*), castor oil, linseed oil and crambe oil, and all the oils obtained from sunflower and rapeseed for example by genetic engineering or hybridization, or obtained from algae.

It is also possible to use waste kitchen oil, slaughterhouse oil, various animal oils such as fish oil, seal oil, tallow, lard, fat from sewage treatment and even fowl fat, because the esters manufactured from some alcohols such as ethyl, isopropyl or butyl alcohol allow to gain more than 10° C. in pour point and consequently to initially use more saturated oils.

The oils used can also include partly modified oils, for example by polymerization or oligomerization, such as for example linseed oil or sunflower oil "stand oils", and blown vegetable oils.

The oils used are neutral or acid, virgin or recycled oils.

The presence of fatty acids in the oils is not a priori harmful. However, in the case of oils with a very high acid number (close to 10 mg KOH/g), one option consists in preceding the transesterification reaction by an esterification reaction of the free fatty acids present, using either the same alcohol as the alcohol used in the transesterification method in the presence of a strong acid such as sulfuric acid or soluble or supported sulfonic acids (of Amberlyst 15® resins type), or using preferably glycerin with the same catalytic system as that used for the transesterification reaction, to form a total or partial glycerol ester, at atmospheric pressure and preferably under vacuum, and at temperatures ranging between 150° C. and 220° C.

When using waste kitchen oils, which are a very cheap raw product for the production of a biodiesel fuel, the fatty acid polymers have to be removed from the reaction mixture so that the mixture of esters meets the specifications of the EN 14214 standard.

Alcohol

The nature of the alcohol used in the method plays a part in the transesterification activity.

In general terms, it is possible to use various aliphatic monoalcohols having for example 1 to 18 carbon atoms, preferably 1 to 12 carbon atoms.

More preferably, the aliphatic monoalcohol comprises 1 to 5 carbon atoms.

The most active one is methyl alcohol. However, ethyl alcohol and isopropyl, propyl, butyl, isobutyl and even amyl alcohols can be considered. Heavier alcohols such as ethylhexyl alcohol or lauric alcohol can also be used.

Methyl alcohol that facilitates the reaction can advantageously be added to the heavy alcohols.

Furthermore, when preparing the ethyl ester, it is possible to use a mixture of ethyl and methyl alcohol comprising 1 to 50 wt. %, preferably 1 to 10 wt. % methyl alcohol so as to increase the conversion.

Operating Conditions of the Transesterification Reaction

The method is carried out at temperatures ranging between 130° C. and 220° C., at pressures below 10 MPa, with excess monoalcohol in relation to the fatty substance/alcohol stoichiometry.

The reaction can generally be operated according to various embodiments.

The reaction can be carried out in discontinuous mode. In this case, it can be conducted in one or two stages, i.e. by carrying out a first reaction up to 85% to 95% conversion to esters, cooling by evaporating the excess alcohol, decanting the glycerin and ending the reaction by heating again to between 130° C. and 220° C. and by adding alcohol to obtain total conversion.

A 98% conversion to esters can also be aimed by working for a sufficiently long time in a single stage under suitable conditions, for example by increasing the temperature and/or the alcohol/fatty substance ratio.

The reaction can be carried out in continuous mode, with a fixed bed or with autoclaves and decanters arranged in series. A partial conversion is performed in a first reactor, most often below 90% and generally of approximately 85%, then decanting is achieved by evaporating the alcohol and by cooling; the transesterification reaction is completed in a second reactor under the aforementioned conditions by adding part of the alcohol previously evaporated. The excess alcohol is finally evaporated in an evaporator and the glycerin and the esters are separated by decantation.

Thus, after these two stages, a biodiesel fuel meeting the specifications is obtained. The conversion level is adjusted so as to obtain an ester fuel meeting the specifications and a glycerin of high purity, by operating in one or two stages.

When selecting a fixed-bed continuous method, it can be advantageous to work at temperatures ranging between 130° C. and 220° C., preferably between 150° C. and 180° C., at pressures ranging between 1 and 7 MPa, the LHSV preferably ranging between 0.1 and 3, more preferably between 0.3 and 2, in the first stage and the alcohol/oil weight ratio ranging between 3/1 and 0.1/1.

The leaching strength is verified in the present invention by a proportion of dissolved metallic traces from the catalyst, in the ester formed as well as in the glycerin produced, below 1 ppm, and by the catalyst activity stability over time.

The catalyst stability is experimentally evaluated over time by monitoring its activity (triglyceride conversion and/or rapeseed methyl ester yield).

If a temperature of 220° C. is not exceeded, an ester of same colour as the initial oil and a colourless glycerin are generally obtained after decantation.

Analysis of the effluents is performed either by gas chromatography for the esters and the glycerin or, more rapidly, by steric exclusion liquid chromatography for the esters.

The ester and the glycerol obtained contain no impurities from the catalyst. No purification treatment is therefore applied to eliminate the catalyst or residues thereof, unlike catalysts working according to a homogeneous process wherein the catalyst or its residues are, after the reaction, located in the same phase as the ester and/or the glycerin.

The ester fuel obtained has a monoglyceride content of at most 0.8 mass %, a diglyceride content of at most 0.2 mass %, a triglyceride content of at most 0.2 mass % and a glycerin content of less than 0.25 mass %.

By means of this type of process, the final purification is reduced to a minimum while allowing to obtain an ester meeting the fuel specifications and a glycerin whose purity ranges between 95% and 99.9%, preferably between 98% and 99.9%.

EXAMPLES

The following examples illustrate the invention without limiting the scope thereof, examples 1 and 4 being given by way of comparison.

Examples 2 and 3 illustrate, in a non exhaustive manner, the preparation of the catalyst used within the scope of the invention.

Examples 5 and 6 given below illustrate tests carried out in a batch reactor and they therefore correspond to a single stage. To obtain a biodiesel fuel meeting the specifications, it would be necessary to perform, at the end of this first stage, a decantation by evaporating the alcohol and by cooling, then to complete the transesterification reaction by adding the evaporated alcohol part.

Examples 7 to 9 were carried out in a traversed fixed-bed reactor and they allowed to highlight the catalyst activity under conditions close to industrial operating conditions. They also allowed to validate the stability of the catalysts over time and the absence of leaching in the effluents of the metals initially present on the catalyst.

The oil used in these examples is rapeseed oil whose fatty acid composition is as follows:

TABLE 1

Rapeseed oil composition

| Fatty acid glyceride | Nature of the fatty chain | Mass % |
| --- | --- | --- |
| Palmitic | C16:0 | 5 |
| Palmitoleic | C16:1 | <0.5 |
| Stearic | C18:0 | 2 |
| Oleic | C18:1 | 59 |
| Linoleic | C18:2 | 21 |
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |

However, any other oil of vegetable or animal origin could give similar results.

The composition of the solid $Zn_xAl_2O_{(3+x)}$ solutions can be deduced from the estimation of their grid cell parameter, using the linear parameter-composition relation in the existence domain of the solid $ZnO$—$Al_2O_3$ solutions.

In the case of phase mixtures in the catalyst, the mass proportions, the compositions of the solid solutions and the ZnO mass content were obtained by X-ray diffraction diagram refinement using the Rietveld method. This method consists in minimizing the integrated intensity differences between an experimental diagram and the diagram calculated from models of the phases present, by refinement of the line profiles and of the structural parameters, in particular the occupancy rate of the tetrahedral and octahedral sites of the lacunar spinel type structure. Two types of constraint were imposed in order to obtain reasonable solutions: respect of the elemental composition of the mixture and electroneutrality of each solid $Zn_xAl_2O_{(3+x)}$ solution.

In the examples hereafter, the elemental analysis results are expressed in mass %.

Example 1

Not According to the Invention

Preparation of a Reference Solid C1 Through Mixing

A catalyst is prepared by mixing an alumina gel of PURAL® SB3 type marketed by the SASOL Company and zinc oxide (BAYER source) in the presence of 20 mass % of peptization agent (nitric acid). The catalyst is extruded with a 3 mm-diameter die and subjected to a thermal treatment at 650° C. for 2 h.

The surface area of the solid is 154 $m^2 \cdot g^{-1}$. X-ray diffraction allows to identify a spinel type major phase whose mean stoichiometry is $Zn_{0.42}Al_2O_{3.42}$ and free ZnO up to 5.5%.

The elemental analysis provides the proportion of the various elements: 24% Zn and 37% Al.

Example 2

Preparation of a Catalyst C2 According to the Present Invention

The solid is prepared by mixing an alumina gel of PURAL® SB3 type marketed by the SASOL Company and zinc oxide (BAYER source) in the presence of 6.2% nitric acid in solution in water, so as to obtain a composition of the material whose elemental analysis is 25% Zn and 37% Al.

The catalyst is extruded with a 3 mm-diameter die and subjected to a thermal treatment at 650° C. for 2 h.

The surface area of the solid is 180 $m^2 \cdot g^{-1}$. X-ray diffraction allows to achieve quantitative determination of the various phases. 10% zinc oxide and two solid solutions, one rich in zinc and the other rich in aluminium, are detected.

Analysis by structure refinement allows to obtain the composition of each phase: ZnO (10%), $Zn_{0.6}Al_2O_{3.6}$ (69%, cell parameter 8.08 Å) and $Zn_{0.05}Al_2O_{3.05}$ (21%, cell parameter 7.92 Å).

Example 3

Preparation of a Catalyst C3 According to the Present Invention

The solid is prepared by mixing an alumina gel and zinc oxide (same sources as in the previous examples) in the presence of 5.8% nitric acid in solution in water, so as to obtain a composition of the material whose elemental analysis is 39% Zn and 27% Al.

The catalyst is extruded with a 3 mm-diameter die and subjected to a thermal treatment at 650° C. for 2 h.

The surface area of the solid is 149 $m^2 \cdot g^{-1}$.

X-ray diffraction allows to achieve quantitative determination of the various phases. 27% zinc oxide ZnO and two solid solutions, one rich in zinc and the other rich in aluminium, are detected.

Analysis by structure refinement allows to obtain the composition of each phase: ZnO (27%), $Zn_{0.7}Al_2O_{3.7}$ (51%, cell parameter 8.08 Å) and $Zn_{0.33}Al_2O_{3.33}$ (22%, cell parameter 8.01 Å).

Example 4

Comparative

Preparation of a Catalyst C4 Based on Magnesium Oxide

The solid is prepared by mixing an alumina gel of PURAL® SB3 type marketed by the SASOL Company and magnesium oxide in the presence of 6% nitric acid in solution in water, so as to obtain a composition of the material whose elemental analysis is 17% Mg and 36% Al.

The catalyst is extruded with a 3 mm-diameter die and subjected to a thermal treatment at 650° C. for 2 h.

The surface area of the solid is 218 $m^2 \cdot g^{-1}$.

X-ray diffraction allows to achieve semi-quantitative determination of the various phases. Approximately 16% magnesium oxide MgO and at least one solid solution Mg—Al whose composition is close to $Mg_{0.9}Al_2O_{3.9}$ are detected.

Catalytic Tests

Example 5

Transesterification of Rapeseed Oil by Methanol in the Presence of a Catalyst C1 According to the Prior Art 25 g rapeseed oil, 25 g methanol and 1 g catalyst prepared as described in Example 1 in extrudate form are fed into a closed reactor at ambient temperature. The methanol/oil mass ratio is thus 1, which corresponds to a molar ratio of 27.5. The reactor is then closed, stirred (200 rpm) and heated to 205° C. by means of a heating magnetic stirrer. The temperature of the reaction medium is stabilized at 205° C. after 30 minutes heating. The pressure is the autogenous pressure of alcohol at the operating temperature, i.e. 4 MPa. The reaction is monitored as soon as the temperature of the reaction medium has reached the set temperature value. Samples are regularly taken in order to follow the progress of the reaction. The samples taken and the final effluent are washed by means of a NaCl-saturated aqueous solution then, after decantation, the upper organic phase is analysed by gel-permeation chromatography (GPC). The table hereafter shows the results obtained.

| Mass % in the organic phase[a] after 2 h | Triglycerides | 49.1 |
|---|---|---|
| | Diglycerides[b] | 20.0 |
| | Monoglyceride | 5.3 |
| | Vegetable oil methyl esters | 25.6 |

[a] determined by GPC
[b] % representing the diglycerides and sterols
t = 0 when the reaction medium is at temperature Leaching of the catalyst in the ester phase is negligible (the zinc and aluminium content estimated by means of the inductively coupled plasma (ICP) technique is below 1 ppm).

Example 6

Comparison of the Activity of Catalysts C1, C2 and C3 in the Reaction of Rapeseed Oil Transesterification by Methanol at 205° C.

Example 5 is repeated using 25 g rapeseed oil, 25 g methanol and 1 g catalyst in extrudate form. The reaction is carried out at 205° C., the temperature of the reaction medium being stabilized after 30 minutes heating. The table below gives the results obtained. Only the proportions of products and reactants after 2 hours reaction are given, but the catalyst classification remains the same after 4 hours and 6 hours reaction.

| | | Catalyst (extrudates) | | |
|---|---|---|---|---|
| | | C1 | C3 | C2 |
| Mass % in the organic phase[a] after 2 h | Triglycerides | 49.1 | 30.1 | 39.8 |
| | Diglycerides[b] | 20.0 | 20.4 | 19.0 |
| | Monoglyceride | 5.3 | 9.5 | 6.1 |
| | Methyl esters | 25.6 | 40.0 | 35.1 |

[a] determined by GPC
[b] % representing the diglycerides and sterols
t = 0 when the reaction medium is at temperature The conversion (estimated in relation to the triglycerides) is 69.9% after 120 min reaction with the catalyst according to the invention C3 and 60.2% with C2. This conversion is higher than that reached with catalyst C1 that is not in accordance with the invention. The rapeseed methyl ester yield is also much higher with the catalysts according to the present invention C3 and C2, i.e. 15 points more with C3 than with C1.

Tests on Traversed Catalytic Bed Units

Example 7

Stability and Activity of Catalysts C2 and C3 in the Reaction of Rapeseed Oil Transesterification by Methanol at Different Temperatures 7 cm glass balls, then 12 g catalyst C2 or C3 in extrudate form, then again 7 cm glass balls are arranged in a 44-cc tubular reactor, and the assembly is heated by means of an oil bath. A catalyst drying stage is carried out in a methanol stream at ambient temperature, and when the water content of the outcoming methanol is equal to the water content of the incoming methanol, the rapeseed oil is injected at a WHSV of 2.7 $h^{-1}$ (g of oil per gram of catalyst per hour), a mass ratio of 1 between the oil and the methanol being used. Four different temperatures were tested, the last point at 160° C. is a return point allowing the catalyst stability to be checked during the test. The total duration of a test is 300 h. The samples are taken when the unit works under stabilized conditions.

| Mass %[a] | | Triglycerides | Diglycerides[b] | Monoglycerides | Methyl esters |
|---|---|---|---|---|---|
| C2 | 160° C. | 63.1 | 10.1 | 2.4 | 23.0 |
| | 180° C. | 46.2 | 10.4 | 3.5 | 38.0 |
| | 200° C. | 37.2 | 8.5 | 3.3 | 48.0 |
| | 220° C. | 32.0 | 7.0 | 3.2 | 55.0 |
| | 160° C. (return point) | 73.0 | 7.3 | 1.7 | 17.0 |
| C3 | 160° C. | 59.7 | 12.5 | 3.1 | 23.2 |
| | 180° C. | 39.0 | 11.7 | 4.2 | 43.0 |
| | 200° C. | 25.0 | 8.7 | 4.2 | 59.0 |
| | 220° C. | 15.6 | 6.1 | 4.0 | 71.0 |
| | 160° C. (return point) | 59.0 | 10.0 | 3.0 | 25.0 |

[a] determined by GPC analysis
[b] % representing the diglycerides and sterols

The two catalysts prepared according to the invention exhibit a stable activity over time. It can be noted that catalyst C4 is more active than C3. The proportion of element Zn determined in the ester is in both cases below the detection limit of the analyzers used.

Example 8

Influence of the Nature of the Alcohol: Comparison of the Activity of Catalysts C2 and C3 in the Transesterification of Rapeseed Oil by Ethanol 7 cm glass balls, then 20 g catalyst C2 or C3 in extrudate form, then again 7 cm glass balls are arranged in a 44-cc reactor heated by means of an oil bath. A catalyst drying stage is carried out in a ethanol stream at ambient temperature, and when the water content of the outcoming ethanol is equal to the water content of the incoming ethanol, the rapeseed oil is injected at a WHSV of 0.67 h$^{-1}$ (g of oil per gram of catalyst per hour), a mass ratio of 1 between the oil and the ethanol being used. Three different temperatures were tested, the last point at 160° C. is a return point allowing the catalyst stability to be checked during the test. The total duration of a test is 560 h. The samples are taken when the unit works under stabilized conditions. The results obtained with the two catalysts C2 and C3 according to the invention are given in the table hereafter.

|    | Mass %$^a$ | Triglycerides | Diglycerides$^b$ | Monoglycerides | Ethyl esters |
|----|---|---|---|---|---|
| C2 | 200° C. | 24.5 | 8.5 | 8.0 | 59.0 |
|    | 220° C. | 9.8 | 4.8 | 7.7 | 77.5 |
|    | 180° C. | 48.8 | 13.3 | 6.3 | 31.2 |
|    | 200° C. (return point) | 27.1 | 9.6 | 7.9 | 55.0 |
| C3 | 200° C. | 20.0 | 7.6 | 7.7 | 64.5 |
|    | 220° C. | 7.5 | 3.9 | 7.4 | 81.2 |
|    | 180° C. | 40.0 | 12.6 | 7.1 | 40.2 |
|    | 200° C. (return point) | 19.4 | 7.7 | 8.0 | 64.9 |

$^a$determined by GPC
$^b$% representing the diglycerides and sterols

The two catalysts prepared according to the invention exhibit a stable activity over time in the ethanolysis reaction. It can be noted that catalyst C3 is more active than C2. The proportion of element Zn determined in the ester is in both cases below the detection limit of the analyzer used.

Example 9

Influence of the Nature of the Oxide: Comparison of the Activity and the Stability of Catalysts C2 and C4 in the Rapeseed Oil Transesterification by Methanol at Different Temperatures 7 cm glass balls, then 12 g catalyst C2 or C4 in extrudate form, then again 7 cm glass balls are arranged in a 44-cc tubular reactor, and the assembly is heated by means of an oil bath. A catalyst drying stage is carried out in a methanol stream at ambient temperature, and when the water content of the outcoming methanol is equal to the water content of the incoming methanol, the rapeseed oil is injected at a WHSV of 2.7 (g of oil per gram of catalyst per hour), a mass ratio of 1 between the oil and the methanol being used. Four different temperatures were tested, the last point at 160° C. is a return point allowing the catalyst stability to be checked during the test. The total duration of a test is 300 h. The samples are taken when the unit works under stabilized conditions.

|    | Mass %$^a$ | Triglycerides | Diglycerides$^b$ | Monoglycerides | Methyl esters |
|----|---|---|---|---|---|
| C2 | 160° C. | 63.1 | 10.1 | 2.4 | 23.0 |
|    | 180° C. | 46.2 | 10.4 | 3.5 | 38.0 |
|    | 200° C. | 37.2 | 8.5 | 3.3 | 48.0 |
|    | 220° C. | 32.0 | 7.0 | 3.2 | 55.0 |
|    | 160° C. (return point) | 73.0 | 7.3 | 1.7 | 17.0 |
| C4 | 160° C. | 68.3 | 10.2 | 2.4 | 17.9 |
|    | 180° C. | 58.7 | 11.0 | 3.0 | 25.7 |
|    | 200° C. | 50.5 | 11.0 | 2.9 | 34.0 |
|    | 220° C. | 41.0 | 10.2 | 3.4 | 42.5 |
|    | 160° C. (return point) | 82.7 | 6.9 | 1.1 | 8.3 |

$^a$determined by GPC
$^b$% representing the diglycerides and sterols

This result clearly shows that catalyst C4 prepared from magnesium oxide according to the same protocol as catalyst C2 according to the present invention is much less stable and less active than catalyst C2. Furthermore, the ICP analysis of the glycerin and ester effluents for both tests shows that, in the case of the test with catalyst C2 (catalyst according to the invention), no trace of zinc is found in the ester or in the glycerin (<0.3 ppm), whereas for the test with catalyst C4, proportions ranging between 0.5 and 1.1 ppm of Mg are found in the glycerin, and no trace is found in the ester.

The catalysts based on MgO are therefore less stable than the catalysts prepared from ZnO, for the same initial proportion of oxide.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 08/07.413, filed Dec. 23, 2008 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of preparing a composition of alcohol esters of linear monocarboxylic acids with 6 to 26 carbon atoms and glycerin, wherein a fatty substance of vegetable or animal origin is reacted with an aliphatic monoalcohol having 1 to 18 carbon atoms, in the presence of at least one heterogeneous catalyst composition comprising at least a solid solution of 70 to 93 mass of $Zn_xAl_2O_{(3+x)}$, wherein x ranges between 0 and 1 (end points excluded), and between 7 and 30 mass % of free ZnO.

2. A method as claimed in claim 1, wherein the catalyst combines at least a solid solution of $Zn_xAl_2O_{(3+x)}$, wherein x ranges between 0 and 1 (end points excluded), with ZnO present at between 10 and 30 mass %.

3. A method as claimed in claim 1, wherein the heterogeneous catalyst is prepared according to a process comprising at least the following stages:
   a) premixing powders of zinc oxide and alumina precursor or zinc oxide, zinc aluminate $Zn_xAl_2O_{(3+x)}$ and alumina precursor, by rotating the arms of a mixer,
   b) mixing resultant premixed powders in the presence of at least one peptization agent comprising a mineral or organic acid,
   c) extruding the paste obtained after mixing, at a pressure ranging between 3 and 10 MPa, and
   d) subjecting the resultant extrudate to a thermal treatment comprising at least the following stages:
      d1) a stage of drying the extrudates obtained in stage c)
      d2) calcination in air
   e) optionally crushing the resultant extrudate obtained at the end of the previous stages, to obtain a different shape.

4. A method as claimed in claim 1, wherein the heterogeneous catalyst is prepared according to a process comprising at least the following stages:
   a) peptizing the alumina precursor in the presence of at least one peptization agent comprising a mineral or organic acid,
   b) adding at least one zinc oxide, or at least one zinc oxide and a mixed $Zn_xAl_2O_{(3+x)}$ oxide to resultant paste obtained in stage a) and mixing the resultant paste,
   c) extruding the resultant paste obtained after mixing, at a pressure ranging between 3 and 10 MPa,
   d) subjecting the resultant extrudate to a thermal treatment comprising at least:
      d1) a stage of drying the extrudates obtained in stage c)
      d2) calcination in air
   e) optionally crushing the extrudate obtained at the end of the previous stages to obtain a different shape.

5. A method as claimed in claim 3, wherein the peptization agent is selected from among hydrochloric acid, sulfuric acid, nitric acid, acetic acid and formic acid.

6. A method as claimed in claim 3, wherein the peptization agent concentration ranges between 2 and 15 wt. %.

7. A method as claimed in claim 3, wherein mixing is carried out for a duration ranging between 15 and 60 min, at a mixer arm rotating speed ranging between 15 and 75 rpm.

8. A method as claimed in claim 3, wherein the thermal treatment to which the catalyst is subjected comprises drying between 40° C. and 150° C., then calcination between 300° C. and 1100° C.

9. A method as claimed in claim 3, wherein the catalyst is produced in the form of powder, extrudates, balls or pellets.

10. A method as claimed in claim 1, wherein said aliphatic monoalcohol comprises 1 to 12 carbon atoms.

11. A method as claimed in claim 1, wherein the method is carried out at a temperature ranging between 130° C. and 220° C., at a pressure below 10 MPa and with excess monoalcohol in relation to the fatty substance/alcohol stoichiometry.

12. A method as claimed in claim 1, wherein the initial oil is selected from among palm oil (concrete or olein), soybean oil, palm nut oil, copra oil, babassu oil, rapeseed oil, old or new, sunflower oil, conventional or oleic, corn oil, cotton oil, peanut oil, pourgher oil, castor oil, linseed oil and crambe oil, algae oil, and the sunflower or rapeseed oils obtained by genetic engineering or hybridization, oils partly modified by polymerization or oligomerization, waste kitchen oil, slaughterhouse oil, fish oil, seal oil, tallow, lard, fat from sewage treatment.

13. A method as claimed in claim 1, wherein the reaction is carried out in discontinuous mode.

14. A method as claimed in claim 1, wherein the reaction is carried out in continuous mode, with a fixed bed or with autoclaves and decanters arranged in series.

15. A method as claimed in claim 14, wherein the reaction is carried out in a fixed bed, at a pressure ranging between 1 and 7 MPa and at a LHSV ranging between 0.1 and 3, with an alcohol/fatty substance weight ratio ranging between 3/1 and 0.1/1.

16. A method as claimed in claim 6, wherein the thermal treatment to which the catalyst is subjected comprises drying between 40° C. and 150° C., then calcination between 300° C. and 1100° C.

17. A method according to claim 10, wherein the aliphatic monoalcohol comprises 1 to 5 carbon atoms.

18. A method as claimed in claim 17, wherein the catalyst combines at least a solid solution of $Zn_xAl_2O_{(3+x)}$, wherein x ranges between 0 and 1 (end points excluded), with ZnO present at between 10 and 30 mass %.

19. A method as claimed in claim 18, wherein the heterogeneous catalyst is prepared according to a process comprising at least the following stages:
   a) premixing powders of zinc oxide and alumina precursor or zinc oxide, zinc aluminate $Zn_xAl_2O_{(3+x)}$ and alumina precursor, by rotating the arms of a mixer,
   b) mixing resultant premixed powders in the presence of at least one peptization agent comprising a mineral or organic acid,
   c) extruding the paste obtained after mixing, at a pressure ranging between 3 and 10 MPa, and
   d) subjecting the resultant extrudate to a thermal treatment comprising at least the following stages:
      d1) a stage of drying the extrudates obtained in stage c)
      d2) calcination in air
   e) optionally crushing the resultant extrudate obtained at the end of the previous stages, to obtain a different shape.

20. A method as claimed in claim 19, wherein the thermal treatment to which the catalyst is subjected comprises drying between 40° C. and 150° C., then calcination between 300° C. and 1100° C.

* * * * *